United States Patent
Rutledge

(10) Patent No.: US 9,615,539 B2
(45) Date of Patent: Apr. 11, 2017

(54) PET BED ASSEMBLY

(71) Applicant: Larry Rutledge, Shelby, NC (US)

(72) Inventor: Larry Rutledge, Shelby, NC (US)

( * ) Notice: Subject to any disclaimer, the term of this patent is extended or adjusted under 35 U.S.C. 154(b) by 112 days.

(21) Appl. No.: 14/597,480

(22) Filed: Jan. 15, 2015

(65) Prior Publication Data

US 2016/0205891 A1    Jul. 21, 2016

(51) Int. Cl.
*A01K 29/00* (2006.01)
*A47D 7/04* (2006.01)
*A01K 1/035* (2006.01)
*A47C 21/00* (2006.01)

(52) U.S. Cl.
CPC ........... *A01K 1/0353* (2013.01); *A47C 21/00* (2013.01)

(58) Field of Classification Search
CPC ........ A47C 31/00; A01K 1/0353; A47D 7/04; A47D 7/00
USPC ................................................ 5/95; 119/28.5
See application file for complete search history.

(56) References Cited

U.S. PATENT DOCUMENTS

| | | | | |
|---|---|---|---|---|
| 317,709 A * | 5/1885 | Blake | ...... | A47D 7/04 5/53.3 |
| 549,820 A * | 11/1895 | Pursell | ...... | A47D 7/04 5/104 |
| 560,979 A * | 5/1896 | Doughty | ...... | A47D 7/04 5/95 |
| 595,930 A * | 12/1897 | Willis | ...... | A47D 7/04 5/104 |
| 812,099 A * | 2/1906 | Taylor | ...... | A47D 7/04 5/94 |
| 814,538 A * | 3/1906 | Grigsby | ...... | A47D 7/04 5/95 |
| 1,431,299 A * | 10/1922 | Godsell | ...... | A47D 7/04 5/308 |
| 1,442,157 A * | 1/1923 | Korp | ...... | A47D 7/04 5/185 |
| 2,406,447 A * | 8/1946 | Waters | ...... | A47D 7/04 5/95 |
| 5,161,484 A | 11/1992 | Duane | | |
| 6,047,422 A * | 4/2000 | Yousif | ...... | A47C 19/04 5/184 |
| 6,588,366 B1 | 7/2003 | Ranson et al. | | |
| 6,862,757 B2 | 3/2005 | Andriunas et al. | | |
| 6,968,810 B2 * | 11/2005 | Bishop | ...... | A01K 1/035 119/847 |
| 7,584,514 B1 * | 9/2009 | Salas | ...... | A47D 7/04 5/659 |
| 7,886,693 B1 * | 2/2011 | Salzman | ...... | A01K 1/0353 119/28.5 |
| 8,230,818 B2 | 7/2012 | Pietra | | |
| 8,381,333 B2 | 2/2013 | Friedman | | |
| 2004/0078895 A1 * | 4/2004 | Elling | ...... | A47D 7/04 5/95 |
| 2006/0042548 A1 | 3/2006 | Tharalson et al. | | |
| 2007/0006808 A1 | 1/2007 | Scatchard et al. | | |

\* cited by examiner

*Primary Examiner* — Kristen C Hayes

(57) ABSTRACT

A pet bed assembly for supporting a pet above a user's bed thereby preventing the pet from disturbing the user when sleeping includes a clamp that may releasably engage a footboard and extend above the footboard. A platform is coupled to the clamp. The platform extends over the bed when the clamp is coupled to the footboard. The platform may support the pet.

7 Claims, 6 Drawing Sheets

PET BED ASSEMBLY

BACKGROUND OF THE DISCLOSURE

Field of the Disclosure

The disclosure relates to bed devices and more particularly pertains to a new bed device for supporting a pet above a user's bed thereby preventing the pet from disturbing the user when sleeping.

SUMMARY OF THE DISCLOSURE

An embodiment of the disclosure meets the needs presented above by generally comprising a clamp that may releasably engage a footboard and extend above the footboard. A platform is coupled to the clamp. The platform extends over a bed when the clamp is coupled to the footboard. The platform may support a pet.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
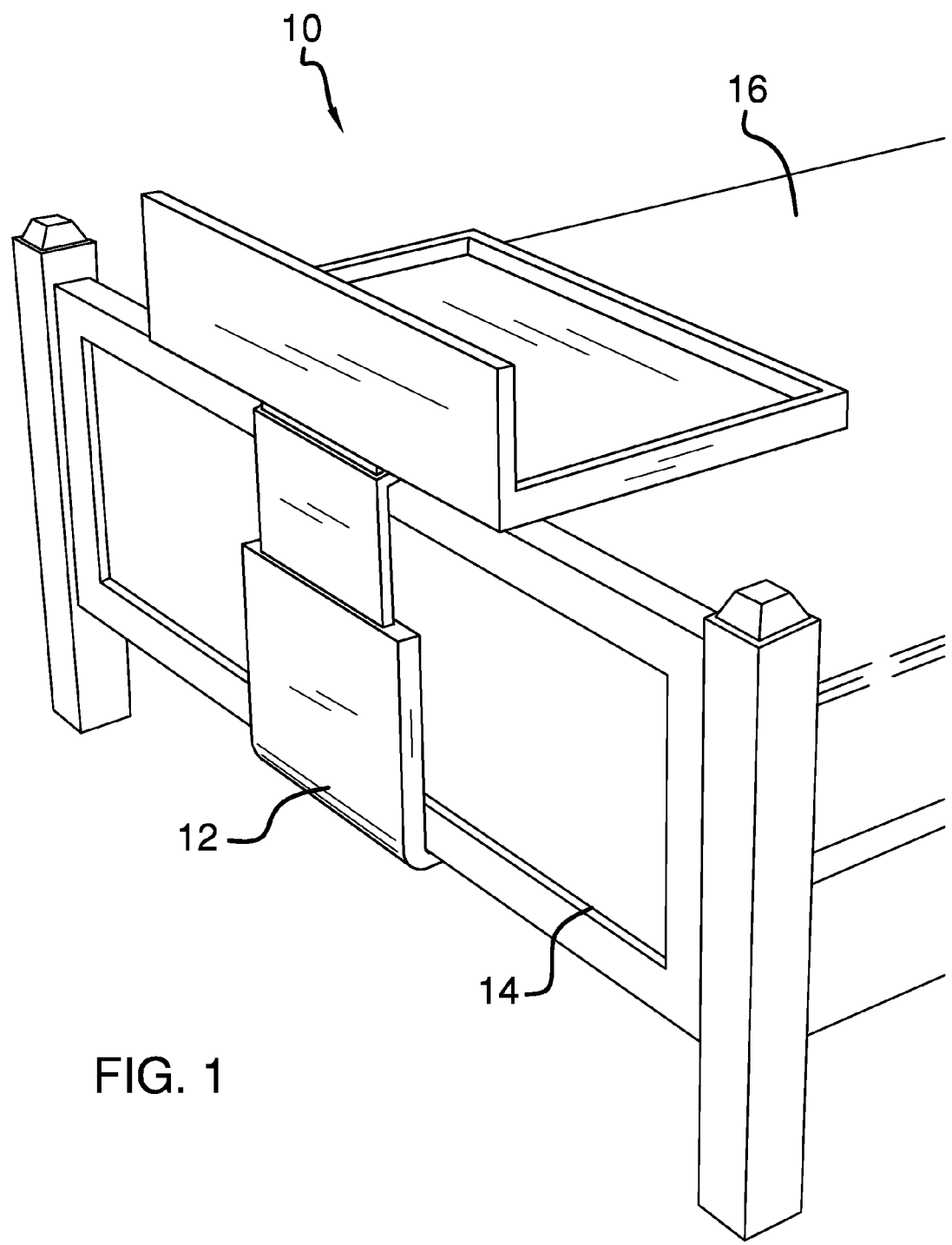
FIG. 1 is an in-use view of a pet bed assembly according to an embodiment of the disclosure.
Figure 2:
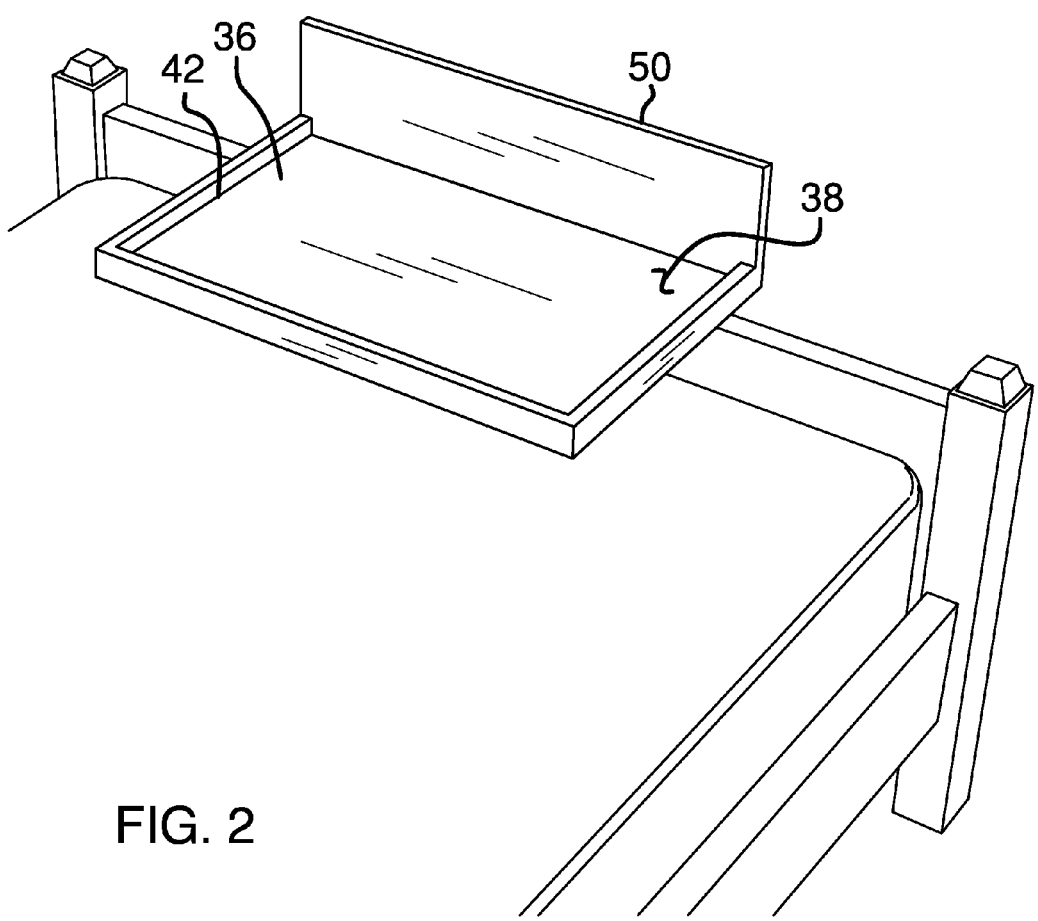
FIG. 2 is a top perspective view of an embodiment of the disclosure.
Figure 3:
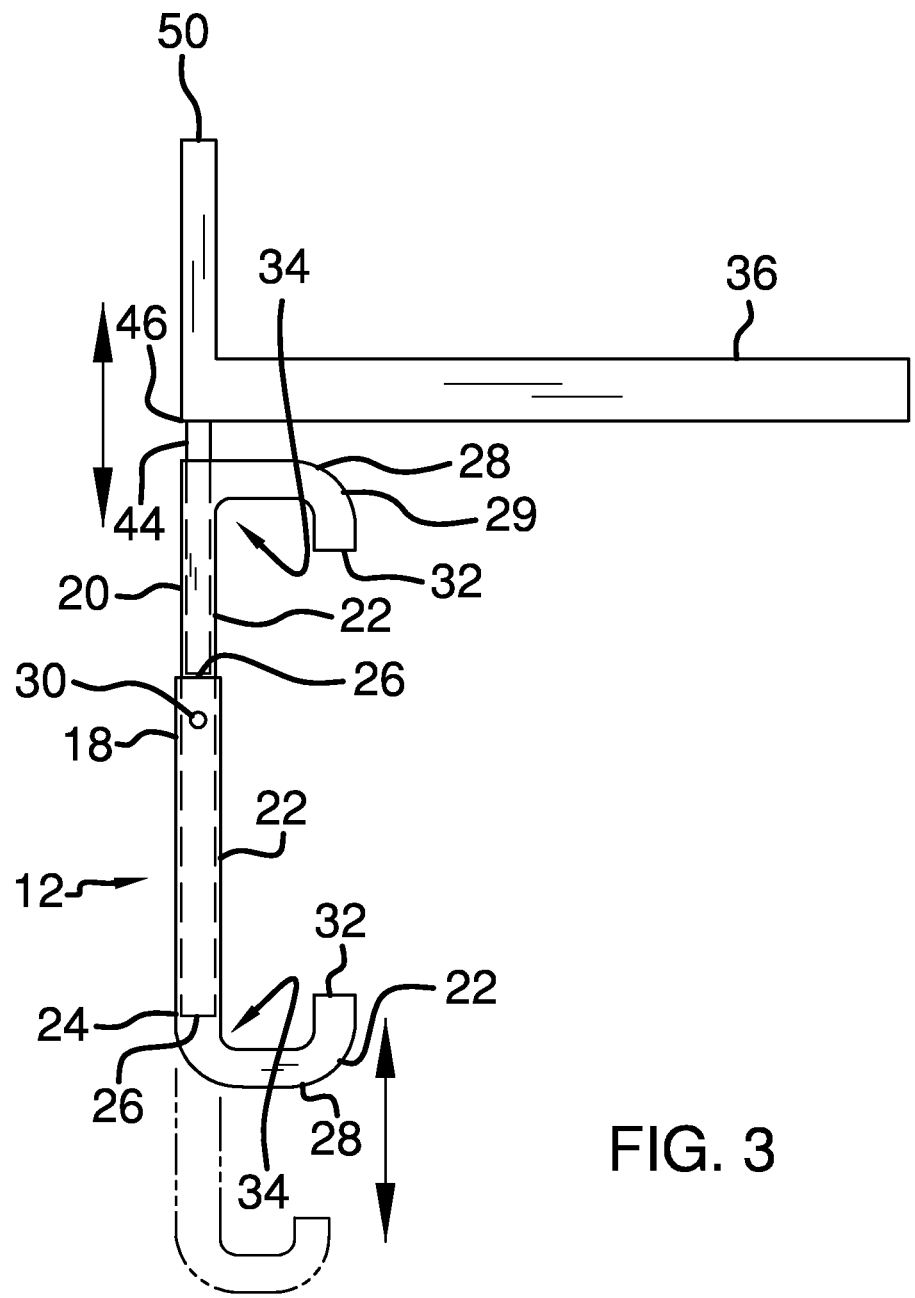
FIG. 3 is a right side view of an embodiment of the disclosure.
Figure 4:
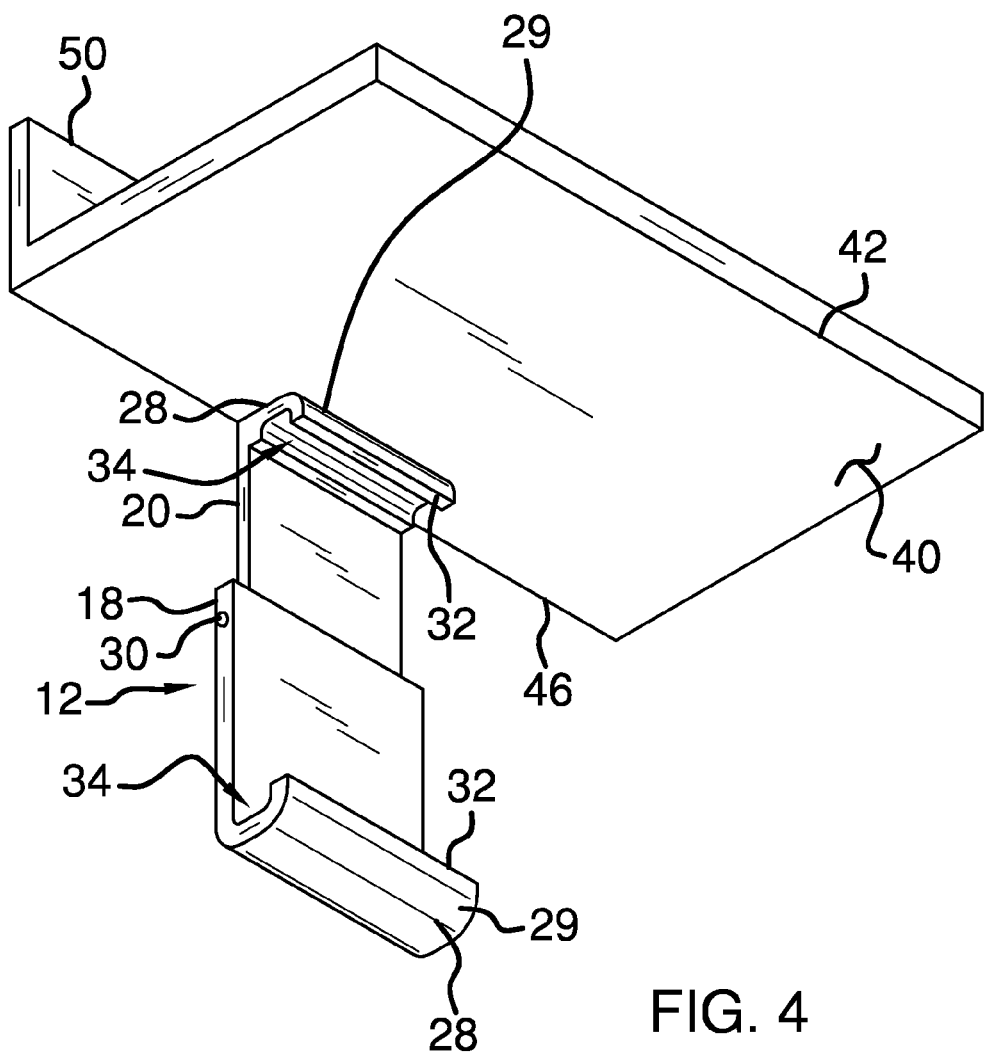
FIG. 4 is a bottom perspective view of an embodiment of the disclosure.

With reference now to the drawings, and in particular to FIGS. 1 through 6 thereof, a new bed device embodying the principles and concepts of an embodiment of the disclosure and generally designated by the reference numeral 10 will be described.

As best illustrated in FIGS. 1 through 6, the pet bed assembly 10 generally comprises a clamp 12. The clamp 12 may releasably engage a footboard 14 of a conventional bed 16 and extends above the footboard 14.

The clamp 12 includes a bottom section 18 and a top section 20 movably coupled to each other such that varying sizes of the footboard 14 are accommodated. Each of the bottom section 18 and top section 20 include a leg 22 that has a first end 24 and a second end 26. A foot 28 is coupled to and extends away from the leg 22. The foot 28 has a distal end 29 with respect to the leg 22. Additionally, the foot 28 is positioned adjacent to the first end 24. The second ends 26 of the bottom section 18 slidably receives the second end 26 of the top section 20. The legs 22 frictionally engage one another such that the feet 28 are retained a selected distance from each other.

Alternatively or in addition to the above, the leg 22 of the bottom section 18 may include a lock 30. The lock 30 may engage the leg 22 of the top section 20. The lock 30 may retain the feet 28 at the selected distance apart from each other. The lock 30 may comprise a pin or the like to removably engage the leg 22 of the top section 20. A lip 32 is provided. The distal end 29 has the lip 32 coupled thereto and extending upwardly therefrom. The lip 32 defines a receiving channel 34 between the lip 32 and the leg 22. The lip 32 on the top section 20 and bottom section 18 extend toward each other. The receiving channel 34 in each of the top section 20 and bottom section 18 receives the footboard 14.

A platform 36 has a top surface 38, a bottom surface 40 and an outer edge 42 extending therebetween. The platform 36 has an arm 44 extending downwardly from the bottom surface 40. The first end 24 of the leg 22 on the top section 20 slidably receives the arm 44. The platform 36 is spaceable a selected distance above the foot 28 on the top section 20. The arm 44 frictionally engages the leg 22 on the top section 20. Thus, the platform 36 is retained at the selected distance from the top section 20. Alternatively, a locking mechanism may be used to retain the arm 44 at a selected position relative to the top section 20.

The arm 44 on the platform 36 is positioned adjacent to a back side 46 of the outer edge 42. The platform 44 extends over the bed 16 when the clamp 12 is coupled to the footboard 14. The top surface 38 may support a pet 48. The pet 48 may be a dog or cat or the like. A backboard 50 is coupled to and extends upwardly from the back side 46. The backboard 50 is coextensive with the back side 46.

Figure 5:
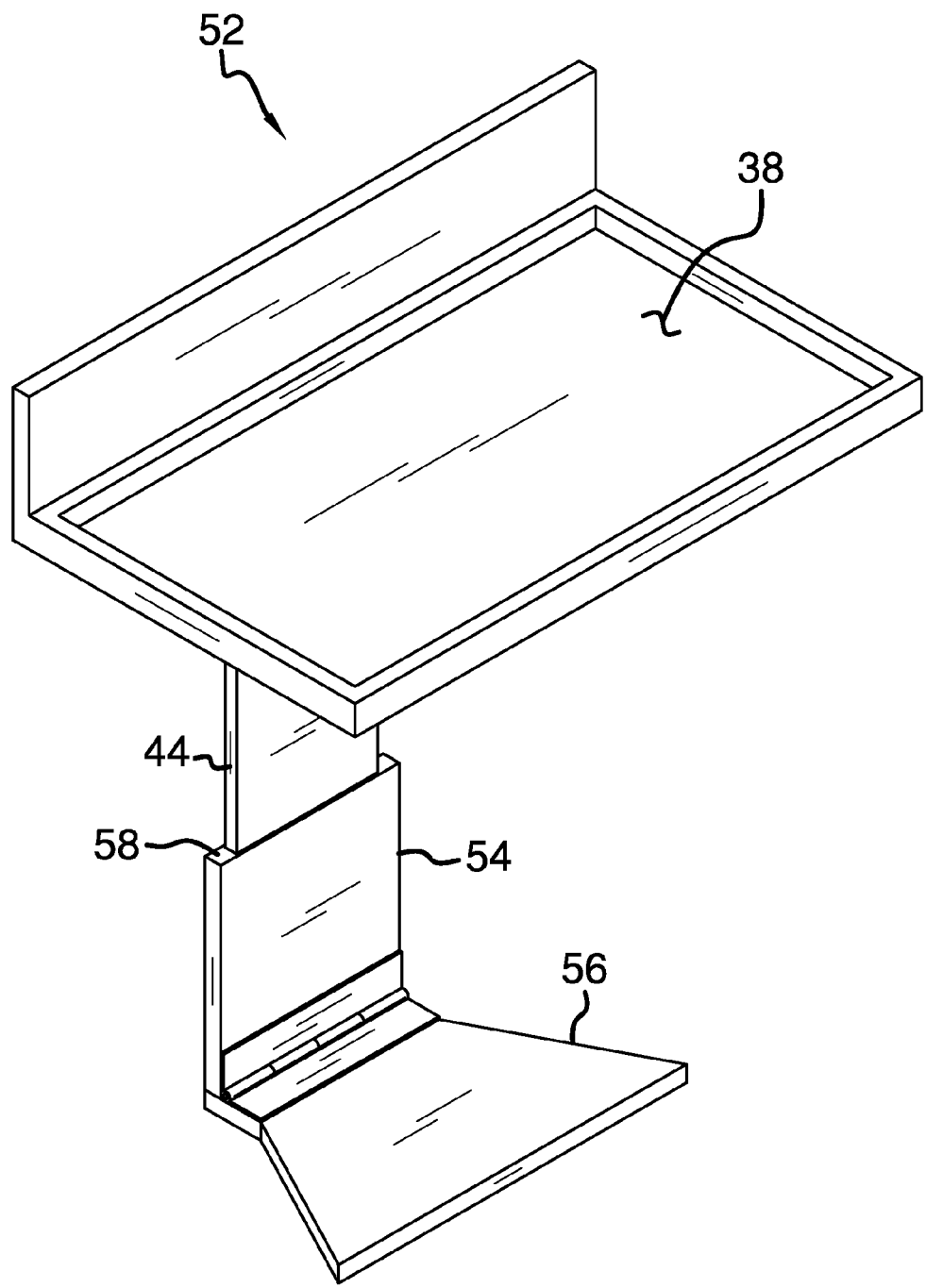
FIG. 5 is a perspective view of an alternative embodiment of the disclosure.
Figure 6:
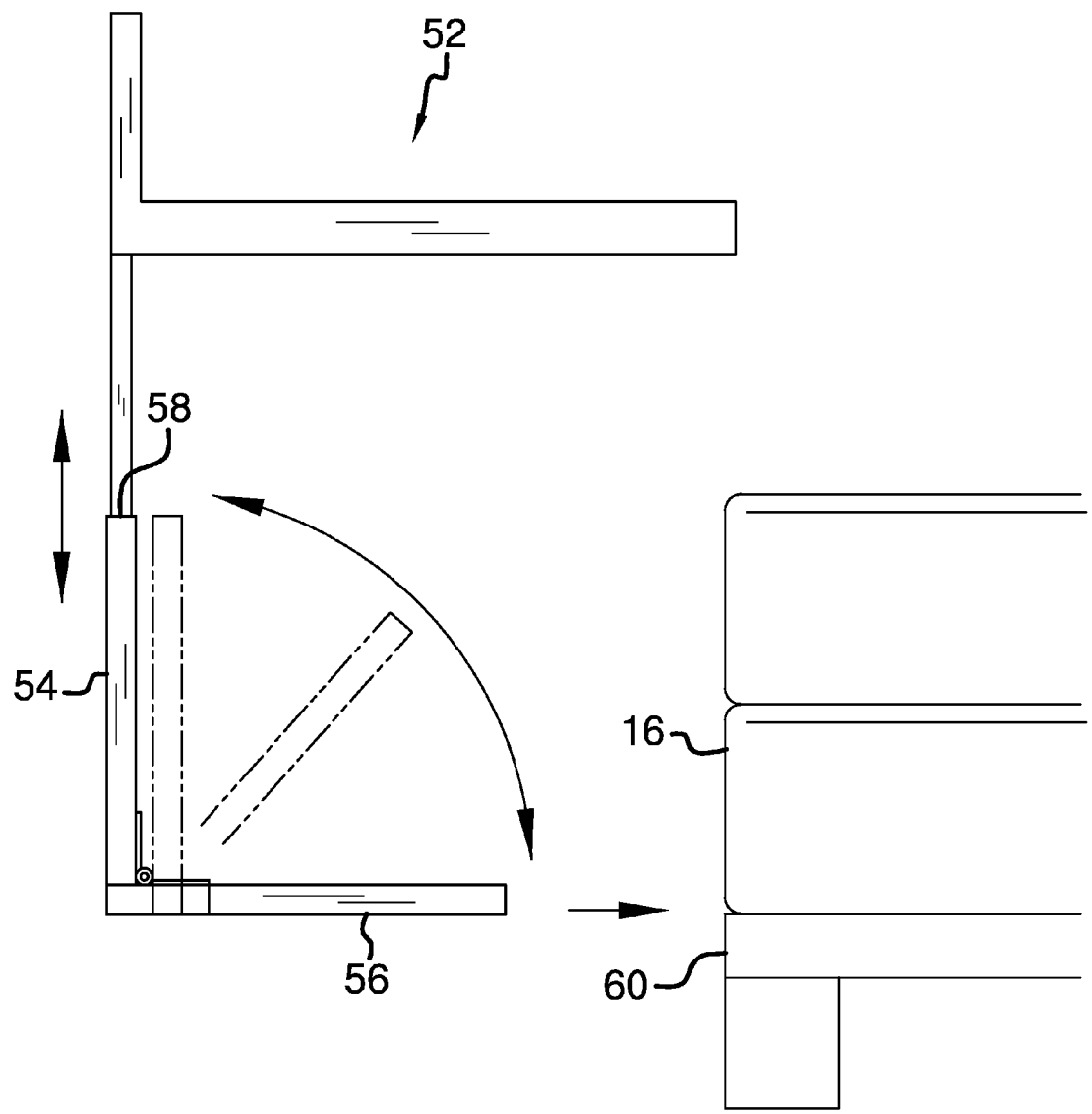
FIG. 6 is an in-use view of an alternative embodiment of the disclosure.

In an alternative embodiment 52 as shown in FIGS. 5 and 6, the clamp 12 may comprise a first section 54 hingedly coupled to a second section 56. The arm 44 on the platform 36 may slidably engage a free end 58 of the first section 54. The first 54 and second 56 sections are positionable to form a right angle with each other. The second section 56 may be positionable between the bed 16 and a frame 60 of the bed 16 so the first section 54 extends upwardly from the frame 60. The first section 54 may be positionable in a stored position having the first section 54 being coextensive with the second section 56. The hinge may be a locking hinge or the like.

In use, the clamp 12 is coupled to the footboard 14 when the pet 48 is to sleep near the bed 16. The pet 48 sleeps on the platform 36 so as not to disturb the bed 16. The assembly 10 allows the bed 16 to be slept in without being disturbed by the pet 48.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A pet bed assembly configured to support a pet above a user's bed thereby preventing the pet from disturbing the user when sleeping, said assembly comprising:
   a clamp configured to releasably engage a footboard and extend above the footboard, said clamp including a bottom section and a top section movably coupled to each other such that said clamp is configured for accommodating varying sizes of the footboard; and
   a platform coupled to said clamp, said platform extending over a bed when said clamp is coupled to the footboard, said platform being configured to support a pet.

2. The assembly according to claim 1, wherein each of said bottom section and top section including a leg has a first end, a foot coupled to and extending away from said leg, said foot having a distal end with respect to said leg, said foot being positioned adjacent to said first end.

3. The assembly according to claim 2, further including a lip, said distal end having said lip coupled thereto and extending upwardly therefrom, said lip defining a receiving channel between said lip and said leg, said lip on said top section and bottom section extending toward each other, said receiving channel in each of said top and bottom receiving the footboard.

4. The assembly according to claim 1, wherein said platform has a top surface, a bottom surface and an outer edge extending therebetween, said platform having an arm extending downwardly from said bottom surface.

5. The assembly according to claim 4, further including a backboard coupled to and extending upwardly from a back side of said outer edge, said backboard being coextensive with said back side.

6. A pet bed assembly configured to support a pet above a user's bed thereby preventing the pet from disturbing the user when sleeping, said assembly comprising:
   a clamp configured to releasably engage a footboard and extend above the footboard;
   a platform coupled to said clamp, said platform extending over a bed when said clamp is coupled to the footboard, said platform being configured to support a pet, wherein said platform has a top surface, a bottom surface and an outer edge extending therebetween, said platform having an arm extending downwardly from said bottom surface;
   said clamp including a top, said top having a foot; and
   said arm on said platform slidably engaging said clamp such that said platform is spaceable a selected distance above said foot on said top section, said arm on said platform being positioned adjacent to a back side of said outer edge.

7. A pet bed assembly configured to support a pet above a user's bed thereby preventing the pet from disturbing the user when sleeping, said assembly comprising:
   a clamp configured to releasably engage a footboard and extend above the footboard, said clamp including:
      a bottom section and a top section movably coupled to each other such that varying sizes of the footboard are accommodated, each of said bottom section and top section including:
         a leg having a first end;
         a foot coupled to and extending away from said leg, said foot having a distal end with respect to said leg, said foot being positioned adjacent to said first end;
         a lip, said distal end having said lip coupled thereto and extending upwardly therefrom, said lip defining a receiving channel between said lip and said leg, said lip on said top section and bottom section extending toward each other; and
      said receiving channel in each of said top section and bottom section receiving the footboard
   a platform having a top surface, a bottom surface and an outer edge extending therebetween, said platform having an arm extending downwardly from said bottom surface, said arm on said platform slidably engaging said clamp such that said platform is spaceable a selected distance above said foot on said top section, said arm on said platform being positioned adjacent to a back side of said outer edge, said platform extending over a bed when said clamp is coupled to the footboard, said top surface being configured to support a pet; and
   a backboard coupled to and extending upwardly from said back side, said backboard being coextensive with said back side.

* * * * *